June 17, 1941.   A. F. HICKMAN   2,245,585
VEHICLE SPRING SUSPENSION
Filed Feb. 27, 1934   8 Sheets-Sheet 1
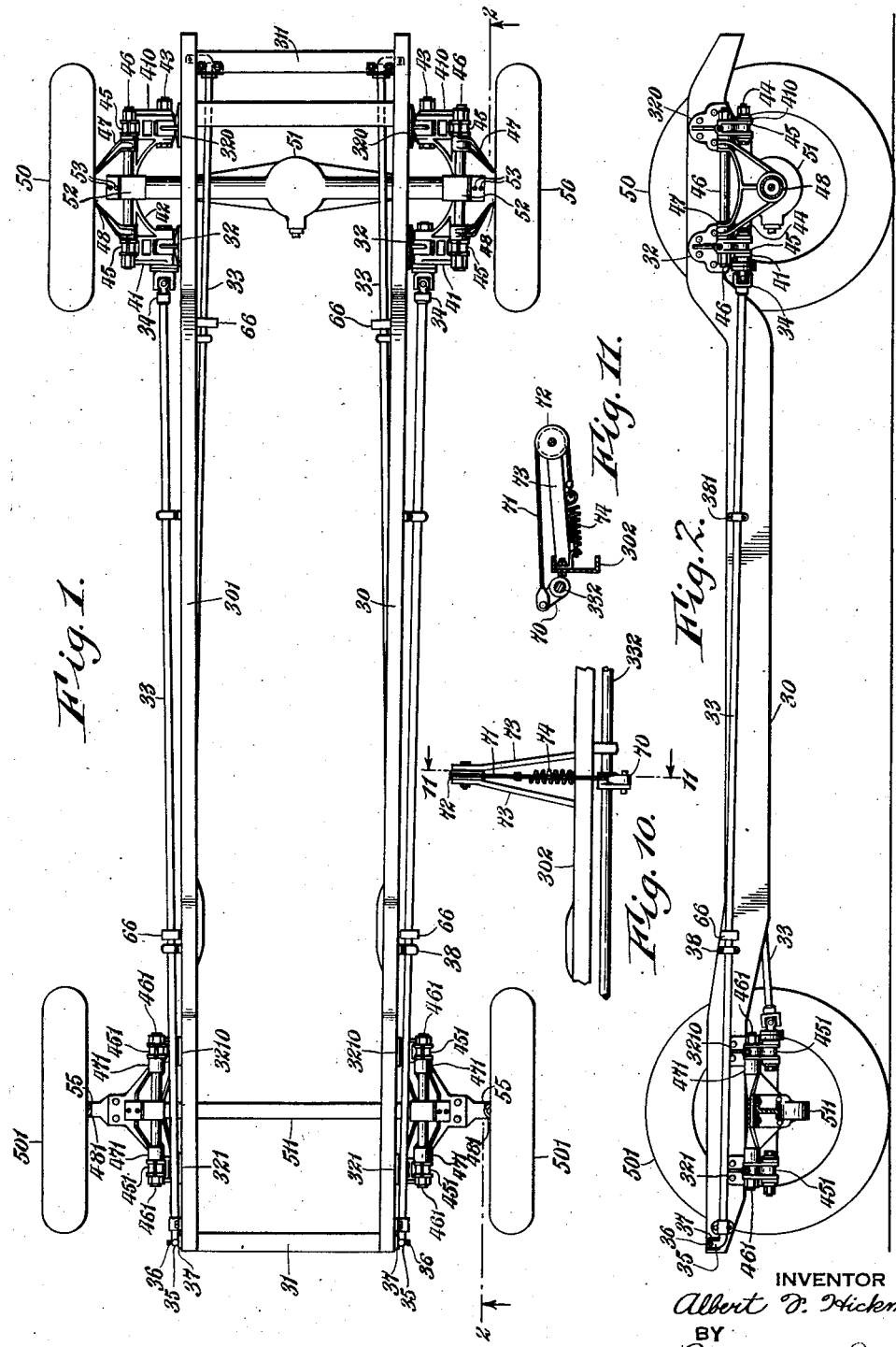
INVENTOR
Albert F. Hickman
BY
Popp and Powers
ATTORNEYS

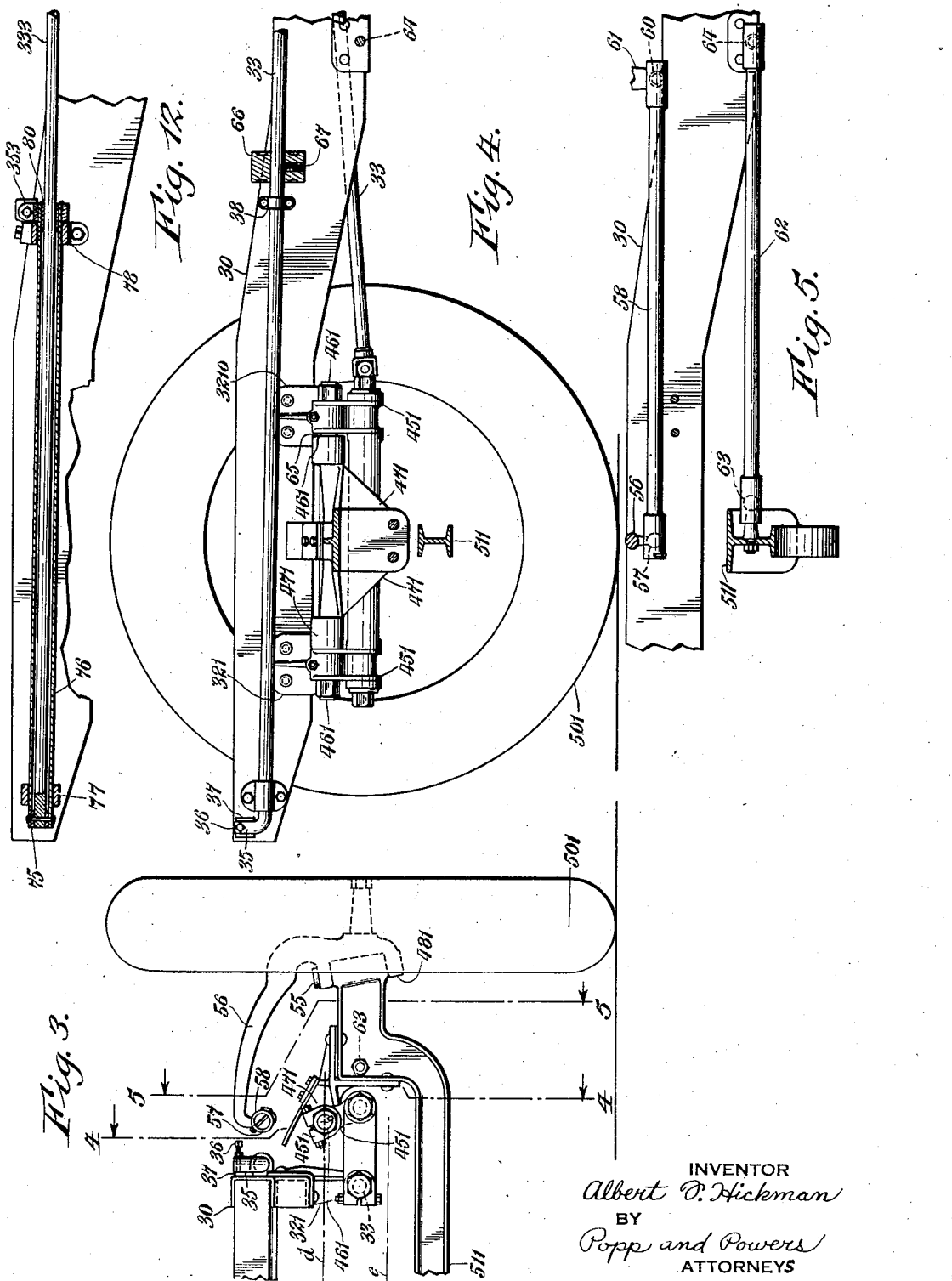

June 17, 1941.  A. F. HICKMAN  2,245,585
VEHICLE SPRING SUSPENSION
Filed Feb. 27, 1934  8 Sheets-Sheet 3
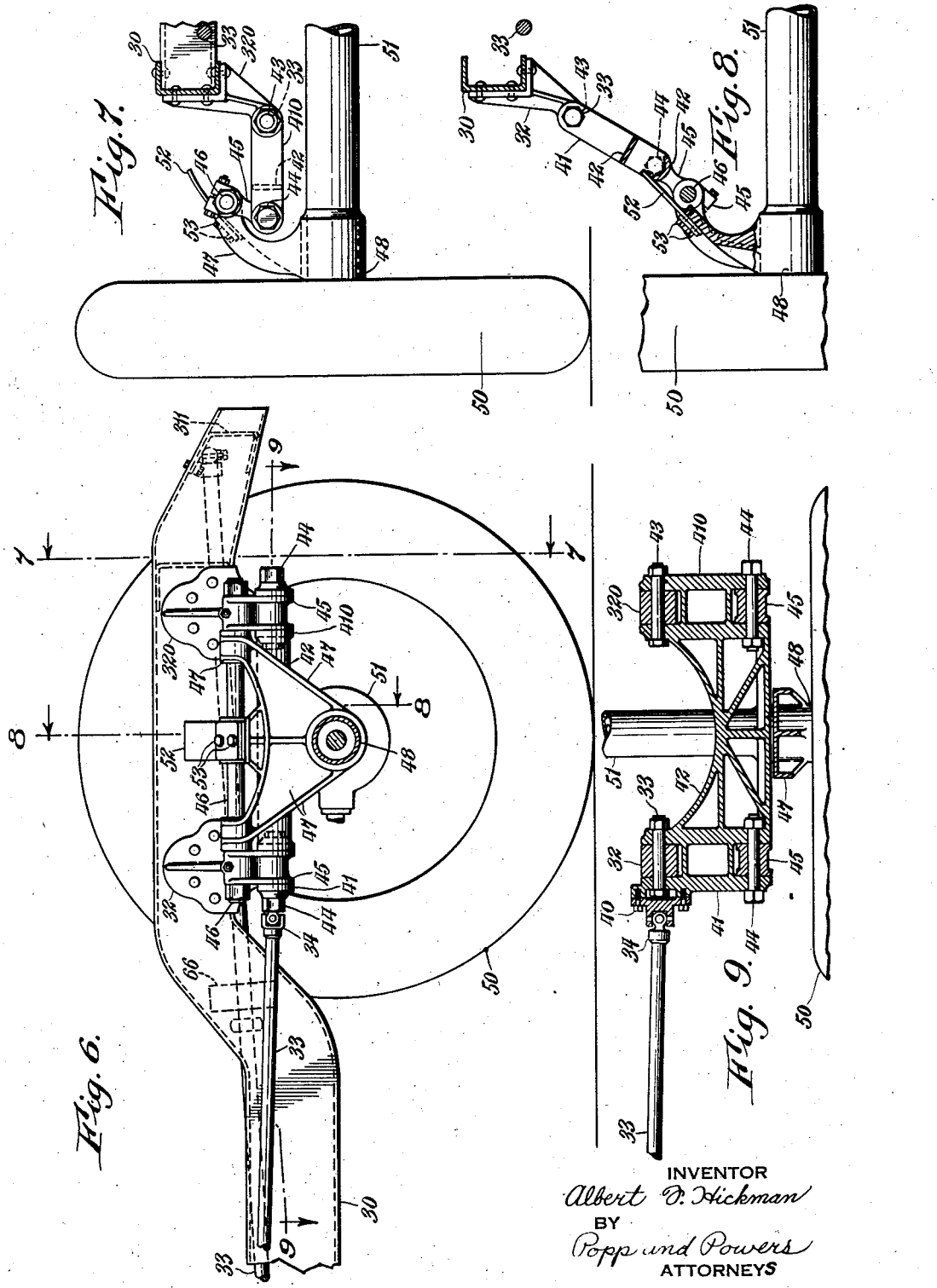
INVENTOR
Albert F. Hickman
BY
Popp and Powers
ATTORNEYS

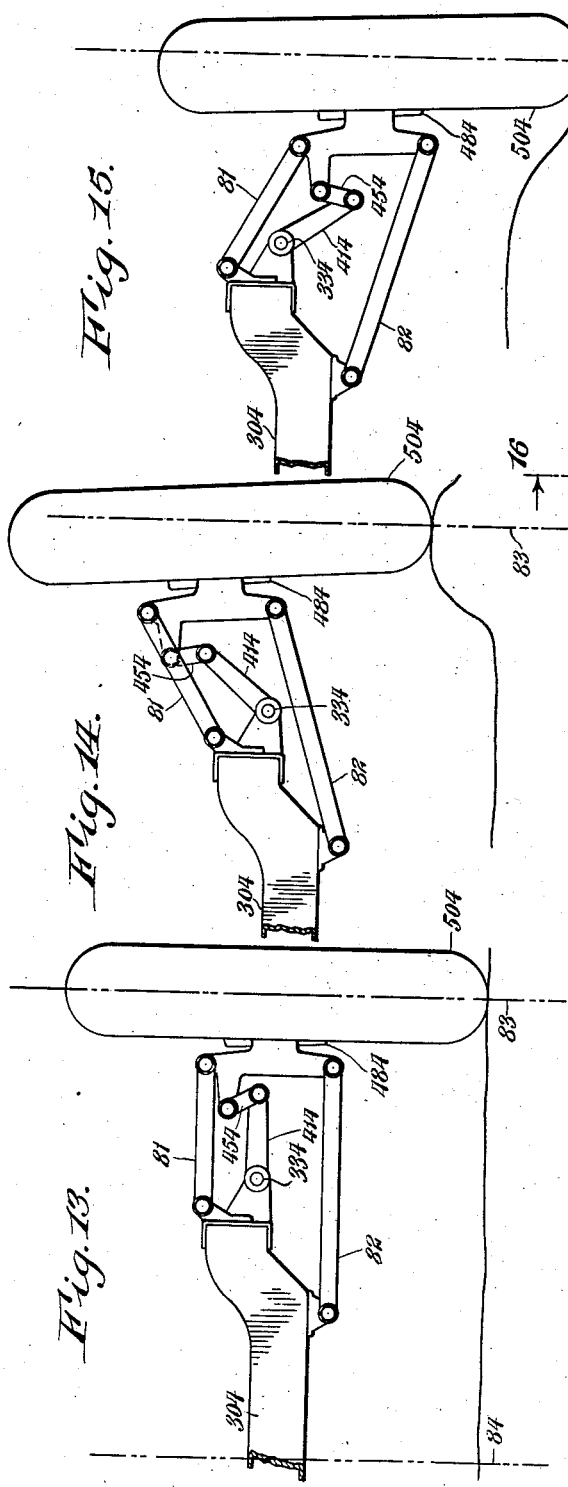

June 17, 1941.  A. F. HICKMAN  2,245,585
VEHICLE SPRING SUSPENSION
Filed Feb. 27, 1934   8 Sheets-Sheet 5
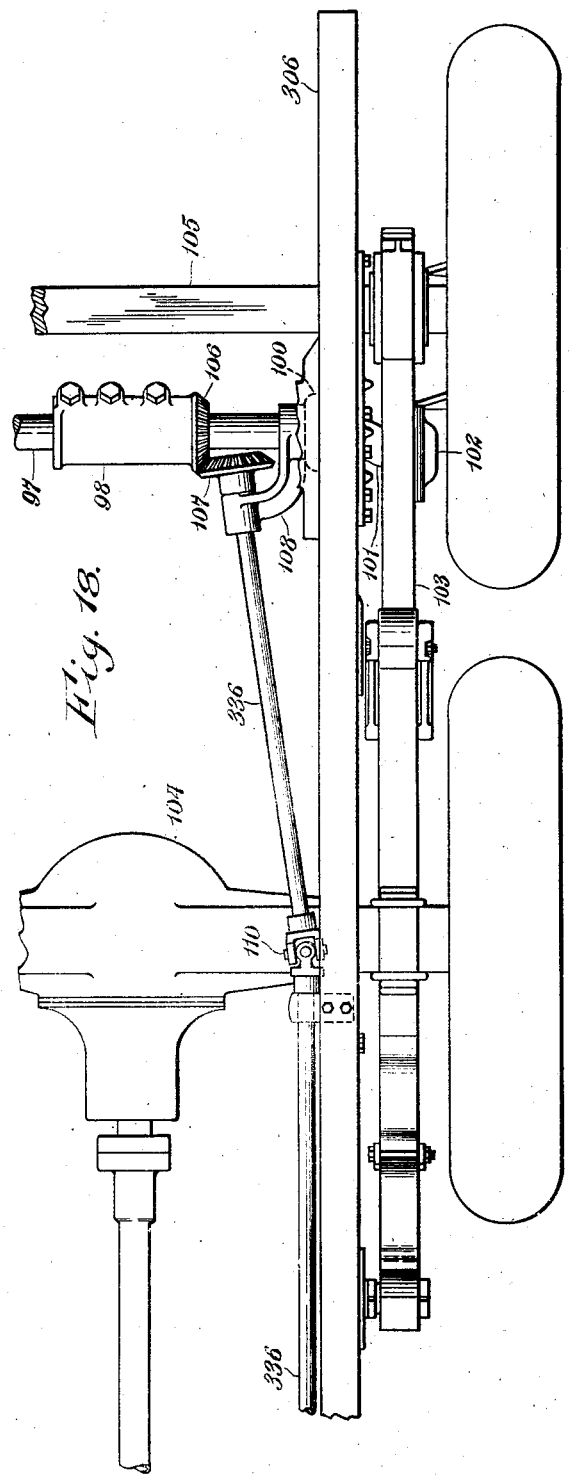
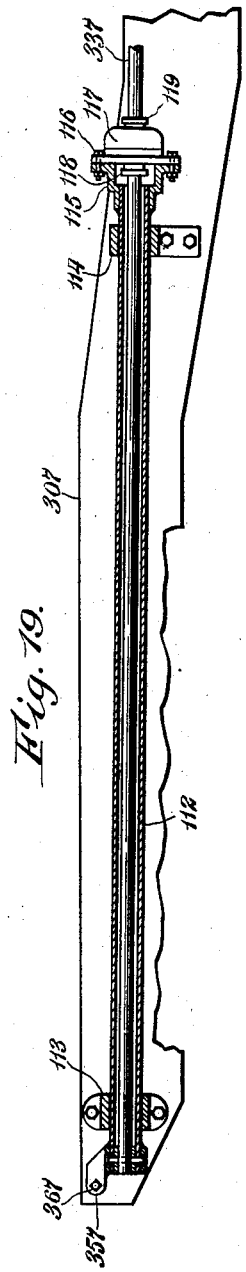
INVENTOR
Albert F. Hickman
BY
Popp and Powers
ATTORNEYS

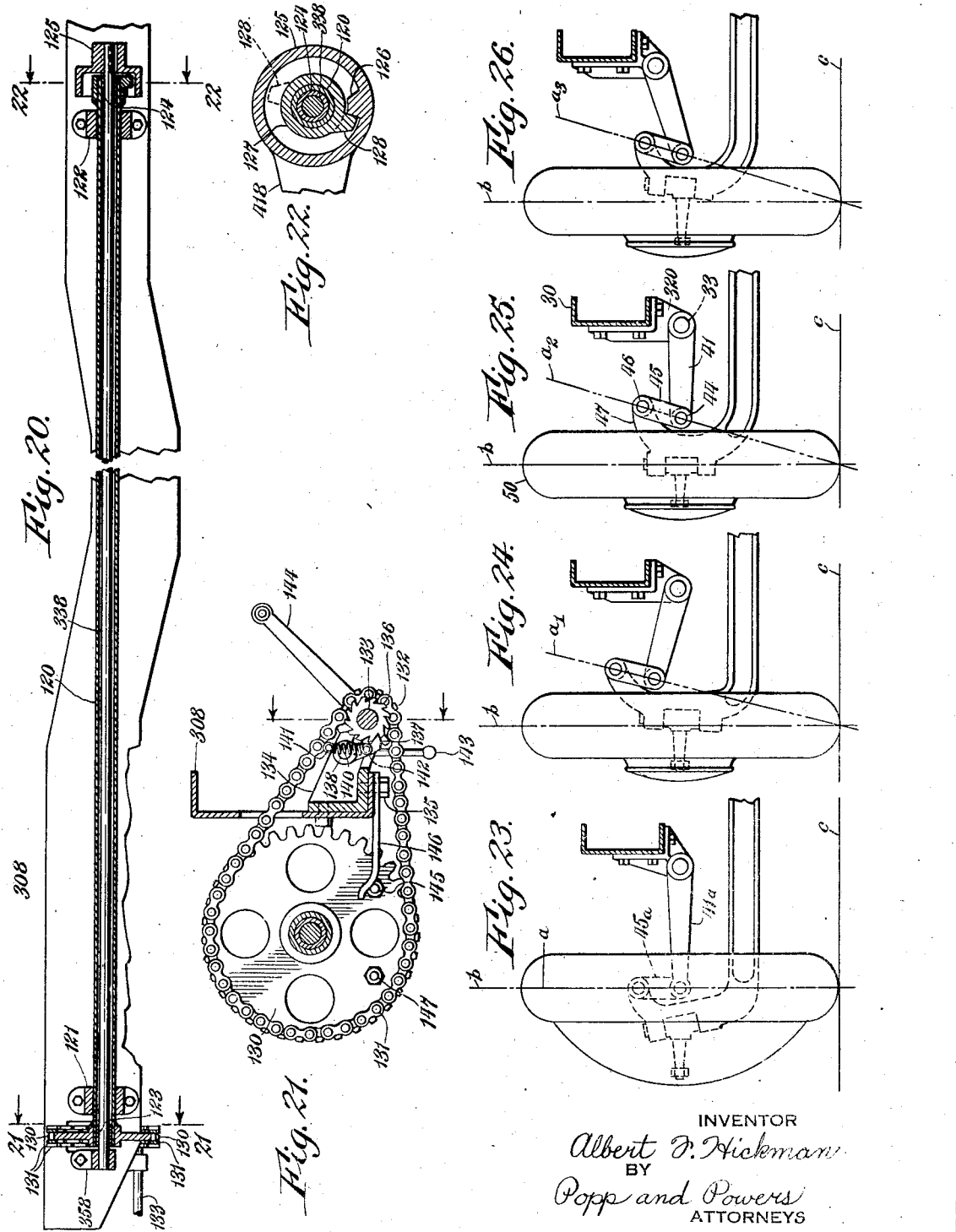

June 17, 1941.  A. F. HICKMAN  2,245,585
VEHICLE SPRING SUSPENSION
Filed Feb. 27, 1934   8 Sheets-Sheet 7
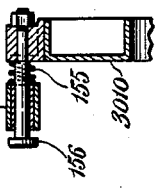
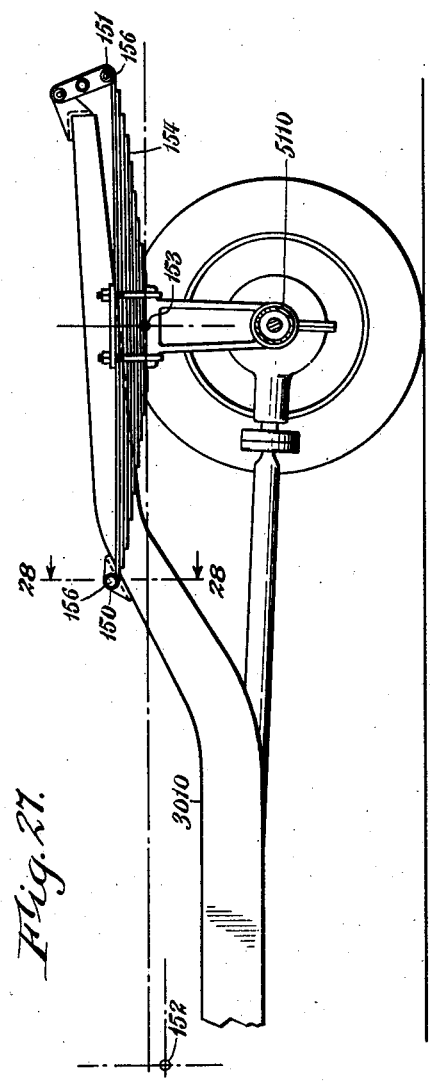
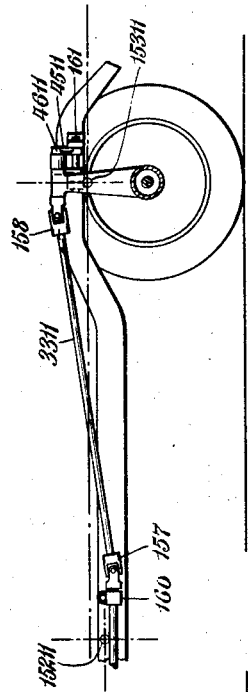
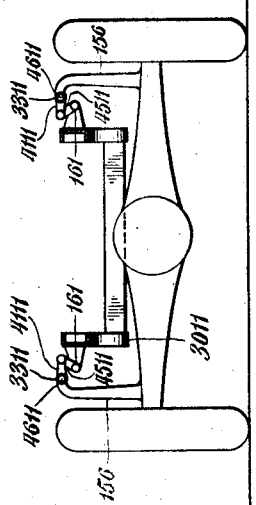
INVENTOR
Albert F. Hickman
BY
Popp and Powers
ATTORNEYS June 17, 1941.  A. F. HICKMAN  2,245,585
VEHICLE SPRING SUSPENSION
Filed Feb. 27, 1934   8 Sheets-Sheet 8
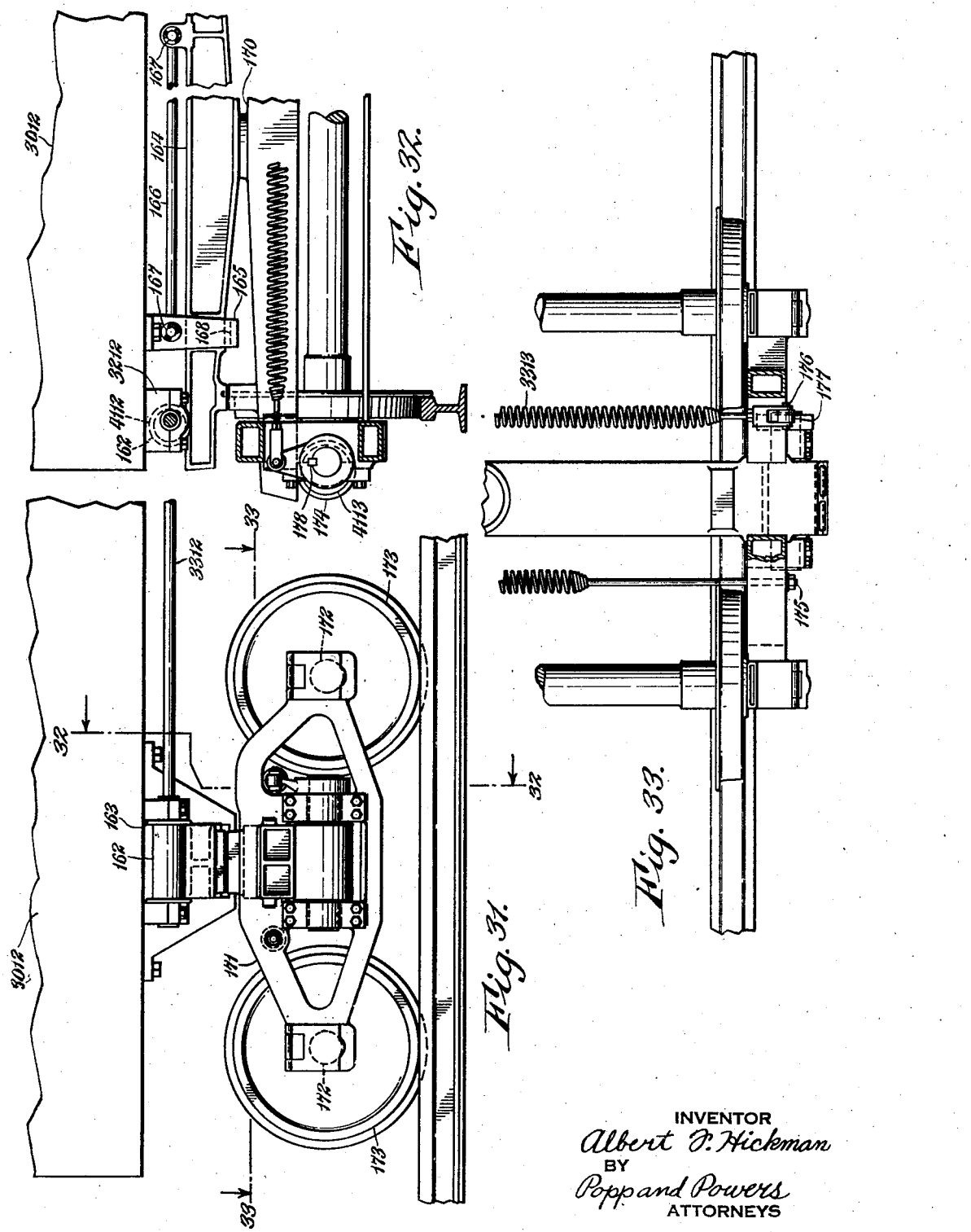
INVENTOR
Albert F. Hickman
BY
Popp and Powers
ATTORNEYS Patented June 17, 1941

2,245,585

UNITED STATES PATENT OFFICE 2,245,585

VEHICLE SPRING SUSPENSION

Albert F. Hickman, Eden, N. Y., assignor to Hickman Pneumatic Seat Co., Inc., Eden, N. Y., a corporation of New York Application February 27, 1934, Serial No. 713,161

20 Claims. (Cl. 267—57)

This invention relates to a spring suspension for vehicles, and more particularly to a spring suspension for those vehicles or portions of vehicles in which the ratio between the maximum and minimum load upon any one or more wheels is nearly equal to unity, such as in the case of passenger automobiles and aeroplanes, railway cars, and the front ends of trucks and busses.

The principal objects of the invention are: (1) to resiliently oppose both up and down vehicle wheel movement by a pure geometric resilient resistance instead of by an arithmetic or a partially arithmetic and partially geometric resilient resistance, (2) to reduce vehicle side sway any desired amount down to and including zero side sway, and even beyond to any desired amount of negative side sway, (3) to eliminate wheel tramp, (4) to considerably reduce the torsional forces to which the vehicle body is subjected, particularly as to the end of the body which is adjacent the axle being deflected, (5) to rapidly dampen out periodic vibration of the spring suspension even if the shock absorbers should become more or less inoperative or even fractured, (6) to reduce the number of shock absorbers required on the vehicle and to reduce the work imposed upon them, (7) to effect a new combination of shock absorber and counteracting periodic vibration, whereby a portion of the resilient members of the spring suspension is employed to oppose periodic vibrations resulting from the action as a whole of said resilient members, (8) to eliminate all frictional resistance except that incident to pivot bearings and shock absorbers, (9) to entirely eliminate the squeaks and lubrication inconvenience of the conventional leaf spring, (10) to definitely limit the stress to which the resilient elements may be subjected, (11) to prevent the wheels from dragging the body down when said wheels move down beyond their normal range of movement, (12) to prevent any change of steering spindle caster even though the resilient members of the spring suspension are stretched past their elastic limit or become fractured, and, at the same time, to eliminate the need of torque rods, (13) to enable a spring suspension of this type being adjusted for maximum efficiency under different loads, (14) to considerably reduce side sway of the vehicle even if the axle pivot of the spring suspension is below the component of the sprung weight center of gravity of the companion axle, (15) to prevent the vehicle body from being subjected to lateral shocks as a consequence of lateral axle movement and to thereby also prevent "tire scuff," (16) to prevent any of the parts of a spring suspension of this type from becoming locked in a past-dead-center position, (17) to enable the vehicle to be safely driven even if the resilient members of the spring suspension become fractured, and (18) to provide means for enabling a considerable torsional deflection of a torsion member even though the overall length of the torsion member is relatively short. Numerous other objects of the invention and practical solutions thereof are described in detail in the herein patent specification wherein:

In the accompanying drawings:

Fig. 1 is a diminutive, top plan of a passenger automobile chassis, provided with one form of my improved spring suspension.

Fig. 2 is a diminutive, vertical, longitudinal section thereof, taken on line 2—2, Fig. 1.

Fig. 3 is a fragmentary front-end elevation thereof showing the front axle and associated parts.

Figs. 4 and 5 are fragmentary, longitudinal sections thereof, taken on correspondingly numbered lines of Fig. 3.

Fig. 6 is a fragmentary, vertical, longitudinal section through the rear end of the vehicle chassis, showing the rear axle and its associated parts.

Fig. 7 is a fragmentary, vertical, transverse section thereof, taken on line 7—7, Fig. 6.

Fig. 8 is a fragmentary, vertical, transverse section thereof, similar to Fig. 7 but taken on a line indicated by 8—8 in Fig. 6 and showing the parts in a different position from that of the other figures.

Fig. 9 is a fragmentary, horizontal section thereof, taken on line 9—9, Fig. 6.

Fig. 10 is a fragmentary, top plan of the central, left portion of a vehicle showing the same provided with a friction type of shock absorber.

Fig. 11 is a fragmentary, vertical, transverse section thereof, taken on line 11—11, Fig. 10.

Fig. 12 is a fragmentary side elevation (somewhat similar to Fig. 4) of the front end of a vehicle equipped with a modified form of torsion rod.

Fig. 13 is a fragmentary end elevation of a vehicle provided with independently mounted "knee action" wheels and showing one example of how my invention may be applied to a vehicle suspension of this general type.

Figs. 14 and 15 are similar to Fig. 13 but show the parts in different operating positions.

Fig. 16 is a fragmentary end elevation, taken on line 16—16, Fig. 17, of another modified form of the invention in which a torque rod is employed.

Fig. 17 is a fragmentary, vertical, longitudinal section thereof, taken on line 17—17, Fig. 16.

Fig. 18 is a fragmentary top plan of the rear end of a three axle (six wheel) vehicle showing the means whereby the torsion rod is used to resiliently oppose rotation of the transverse crank shaft.

Fig. 19 is a fragmentary, vertical, longitudinal section analogous to Figs. 4 and 10 and taken through the front end of a vehicle provided with a modified means of controlling reaction of the torsion rod.

Fig. 20 is a fragmentary, vertical, longitudinal section through the front end of a vehicle equipped with a compound torsion rod.

Figs. 21 and 22 are enlarged, vertical, transverse sections thereof, taken on correspondingly numbered lines of Fig. 20.

Figs. 23–26 are diagrammatic representations of the invention provided with different crank arm and linkage arrangements, but all arranged in such manner as to eliminate wheel tramp.

Fig. 27 is a fragmentary, vertical, longitudinal section through the rear end of a vehicle provided with semi-elliptic springs so arranged as to have negative side sway.

Fig. 28 is an enlarged vertical, transverse section thereof, taken on line 28—28, Fig. 27.

Fig. 29 is an end elevation of a modification of my invention in which the torsion rod is mounted on the axle instead of on the frame.

Fig. 30 is a fragmentary, vertical, longitudinal section thereof.

Fig. 31 is a fragmentary side elevation of a railway car equipped with my improved spring suspension.

Figs. 32 and 33 are respectively vertical, transverse and horizontal sections thereof, taken on correspondingly numbered lines of Fig. 31.

It is to be understood that similar characters of reference indicate like parts in the several figures of the drawings.

My invention may be embodied in various forms and in spring suspensions of different constructions, and the present embodiments thereof are to be regarded merely as a few of the set-ups which carry out the invention in practice.

*One form of passenger car set-up—Figs. 1–9*

In the form of the invention shown in Figs. 1–9, and in all the other forms of the invention, the main frame of the vehicle chassis is constituted in the usual and well known manner of a pair of longitudinal and substantially horizontal, side frame bars 30 and 301 which are connected at their front and rear ends respectively by the front and rear cross bars 31 and 311.

The entire vehicle chassis, together with its sping suspension, is constructed substantially symmetrically about a vertical longitudinal medial plane, and hence it is deemed sufficient to confine the following description almost entirely to the one (left) side of the vehicle, it being understood that a similar and substantially symmetrical arrangement is to be found on the other (right) side of the vehicle. Furthermore, the spring suspension at the rear end of the construction of Figs. 1–9 is somewhat simpler in construction than the front end, and will for that reason be described first.

Secured adjacent the rear end of the left, side, frame bar 30 is a pair of hangers 32 and 320.

In the lower end of the forward hanger 32 (see Figs. 9, 7 and 6) is journalled a pivot pin 331 having a head and a nut similar in appearance to a bolt. Said pivot pin 331 is connected through a universal joint 34 with a torsion rod 33, the extreme forward end of the latter being bent sharply upward to form the torque arm 35, as shown in Figs. 4, 3, 2 and 1. The upper end of said torque arm is provided with an adjusting screw 36 (or other suitable adjusting means), the inner end of which bears against a pad 37 which may, if desired, be constructed of resilient material such as rubber, and is suitably secured to the adjacent vertical longitudinal face of the companion frame bar 30. The purpose of this adjustment screw 36 is to adjust the amount of torsional stress imposed upon its companion torsion rod 33.

It is to be understood that when such an adjustment is not desired (if it be desired to render the device more fool-proof, for instance), the spring suspension may be produced with sufficiently restricted torsional and other tolerances, and said adjusting screw 36 then entirely eliminated. Likewise, the pad 37 may, if desired, be also eliminated, a resilient connection at this point being, as a matter of fact, of very small intrinsic worth due to the fact that only under very unusual circumstances will conditions be such as to allow the torque arm 35 to move away from the frame bar 30. It is likewise obvious that the universal joint 34 may also be eliminated if the vehicle set-up is such as to permit the two sections of the torsion rod 33 to be disposed in axial alignment with each other.

If desired, the intermediate portions of the torsion rod 33 may, as shown, be suitably supported on the frame bar 30 by a pair of bearings 38 and 381, the latter being secured to said frame bars 30, 301 in any suitable manner.

The rear portion or head of the universal joint 34 is suitably flanged and detachably connected by cap screws 40 with the inner end of a bifurcated, front crank arm 41. This construction, in effect, rigidly connects the pivot pin 331 with said front crank arm 41. It is obvious that such a rigid connection may be effected in numerous ways other than in the particular manner illustrated. When the vehicle is normally loaded and at rest, this front crank arm 41 projects outwardly and substantially horizontally from the torsion rod 33, as shown in Figs. 7, 6, 9, 1 and 2. In this position the outer end of said front crank arm 41 is resiliently urged downwardly by the resilient stress imposed upon it by the torsional stress of its companion torsion rod 33.

As best shown in Fig. 9, the outer part of said bifurcated front crank arm 41 is connected on its outer rear side by an integral webbing 42 (or otherwise) with the outer part of a companion, bifurcated, rear crank arm 410. The inner end of this rear crank arm 410 is provided with a pivot pin 43 which is pivoted in the rear hanger 320 aforedescribed. The axis of this pivot pin 43 is coincident with the axis of the pivot pin 331, thereby permitting the two crank arms 41 and 410 (together with the integral webbing 42 which joins them) to swing in a vertical transverse plane about the common axis of said pivot pin 331 and of said pivot pin 43.

The outer ends of both of said crank arms 41 and 410 are bifurcated and are provided with a pair of horizontal pivot pins 44 which are axially in line with each other. The central portion of each pivot pin 44 is pivoted in the normally lower end of a companion link 45, which latter, in the normal or static, loaded position of the vehicle spring suspension shown in Figs. 7, 6, 9, extends upwardly and inwardly from said pivot pin 44.

The upper ends of the two links 45 are split (see Fig. 7) and are clamped upon the opposite ends of a relatively long, horizontal, longitudinal, axle-pivot shaft 46. By reason of the fact that said links 45 are both clamped at their upper ends to said axle-pivot shaft 46, the term links is not strictly accurate, but has been here used to avoid excessively clumsy phraseology and to more clearly distinguish said "links" from the crank arms 41, 410.

Between said links 45 is disposed an upstanding "Y" shaped trunnion 47, the upper, bifurcated arms of which are journaled on said axle-pivot shaft 46 while its lower central part or head is suitably secured by welding or otherwise to a companion wheel spindle 48. The latter has a rear, driving wheel 50 journaled thereon in the usual and well known manner. This spindle 48 constitutes one of the outer ends of the rear or drive axle (or axle housing) 51.

It is admitted that, in ordinary parlance, the outer portion of an automobile drive axle is not ordinarily denominated a spindle, but it is so defined in Webster's dictionary and it is necessary to assume some such definition as this if generic claims are to be drawn to cover the various forms of axles and wheel spindles illustrated herein. As far as the present spring suspension invention is concerned, there is no requirement that the driving axle 51 or any of the axles illustrated herein be constructed in one piece, inasmuch as each wheel spindle 48 is provided with its own individual spring suspension. Thence it is deemed proper to denominate each end of said drive axle 51 as a wheel spindle.

When said drive axle 51 drops approximately to its lowermost position relatively to the vehicle frame, as shown in Fig. 8, there is a possibility (unless such a contingency be positively prevented) that the crank arms 41, 410 and links 45 will be moved by inertia forces past their dead-center position, and become locked in this position. To prevent any such occurrence a flat, limiting spring 52 is secured to the central part of the trunnion 47 by means of cap screws 53 or otherwise, the outer portion of said limiting spring 52 being adapted to make contact (see Fig. 8) with the central, outer portion of the webbing 42 which forms an integral part of the two crank arms 41 and 410. This contact between said spring 52 and webbing 42 is initially made at a relatively long distance from the absolute dead-center position and the parts then gently stopped at the final position of complete rest shown in Fig. 8 where the parts are shown as having almost, but not quite, arrived at an absolute dead-center position. It should be noted that in this connection, however, that, even if the parts move to or even beyond an absolute dead center position, said parts are not likely to lock in this past-dead-center position because the resilient force of the torsion rod 33 is always urging the pivot pins 44 downwardly, and this factor may, in actual practice, be quite safely relied upon to "break" any possible dead center locking.

When the axle 51 is forced upwardly relatively to the main frame from the position of Fig. 7 (or, vice versa, when the body under the influence of momentum, is forced downwardly relatively to said axle) the effective resilient opposing force of the torsion rod 33 increases at a geometric and not at an arithmetic rate. In this particular case, the geometric rate is of the accelerated increase type, in which increments of vertical movements of the axle are opposed by an accelerated rate of resilient resistance. This is primarily due to the progressive decrease in the effective lever arm of the crank arms 41, 410, as they swing upwardly and inwardly about the rear section of the torsion rod 33 and the pivot pin 43 as an axis of rotation. This action is also influenced by the varying angularity of the links 45 and the fact that increments of vertical displacement of the pivot pins 44 cause accelerated rates of increase in the angular displacement of the torsion rod 33. This latter is due to the fact that increments of vertical movement of said pivot pins 44 are not proportional to the accompanying increments of angular twist to which their companion torsion rod 33 is subjected.

This geometric action also occurs when the axle 51 moves downwardly a certain distance relatively to the frame bar 30 from the normal position of Fig. 7 to a position intermediate of the extreme position of Fig. 8. Throughout this particular movement, the geometric action is of the accelerated decrease type, i. e., as the axle passes through increments of downward movement, the rate of decrease of the resilient force tending to push said axle downward increases.

Thus, as the axle moves downwardly from the position of Fig. 7, the resilient force tending to push it downwardly decreases at an accelerated rate. Finally, at a position intermediate of Figs. 7 and 8, this downward pressure on the axle 51 becomes equal to zero. Then, as said axle continues to move downwardly beyond this intermediate point, the torque arm 35 is turned or rotated outwardly away from its pad 37, thereby relieving the torsion rod 33 of all torsional stress, thereby maintaining at zero the value of the resilient force interposed between the axle and the main frame. This condition continues until the axle has moved downwardly to its lowermost position as shown in Fig. 8. During this last mentioned downward axle movement, said axle, together with its wheels 50 and other unsprung weight, rests with its entire weight upon the ground (assuming, of course, the latter to be within reach) and hence without any of said unsprung weight urging the main vehicle frame downward. This means that, as far as vertical forces are concerned, said vehicle frame is, at this time, free to "float" along solely under the influence of gravity (plus whatever vertical momentum forces are present), this feature of the invention being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and body. Such a desirable result is quite different from that obtained from the conventional spring suspension in which the axle and the rest of the unsprung weight drags or jerks down the main frame whenever the strain imposed on the main springs is negative. In the present invention no such negative force, tending to pull the body downward, is possible.

The front or steering axle 511 of the vehicle of Figs. 1-9 is provided with a spring suspension analogous to that just described for the back axle 51. However, certain inherent characteristics of a front axle require certain modifications to the present invention when the same is to be applied to a front axle. In the case of the form of front axle 511 shown in Figs. 3, 4, 5, 1 and 2, for instance, a wheel spindle 481 having a wheel 501 journalled thereon is pivoted on a substantially vertical spindle pin 55 at each end of said front axle 511. The two wheel spindles 481 at opposite ends of said axle are assumed to be cross connected for steering purposes in the usual and well known manner. Extending horizontally inward from one of these spindles is a steering arm 56 connected by a universal joint 57 with the front end of the usual steering or drag link 58 (see Fig. 5). The rear end of the latter is connected, in the usual and well known manner, by a universal joint 60 with the lower end of a manually actuated steering lever 61.

It is important that the steering arm 56 be never moved relatively to the axle 511 as a consequence of any sort of up and down axle movement. Any such deleterious movement has been absolutely prevented by the construction here illustrated. A radius rod 62 is connected at its front end by a universal joint 63 with the front axle 511 and is connected at its rear end by a universal joint 64 with the side frame bar 30 of the main frame. This radius rod 62 has its universal joint pivots 63 and 64 spaced apart the same distance as the spacing apart of the universal joint pivots 57 and 60 of the drag link 58. In addition to this, the disposition of the various pivot centers is such that all planes intersecting the pivots 63 and 64 of the radius rod 62 are parallel to all planes intersecting the pivots 57 and 60 of the drag link 58.

A small amount of longitudinal clearance is then provided at 65 whereby the axle 511 with its trunnion 471 is free to slide a short distance longitudinally on the axle pivot shaft 461, the latter being firmly clamped at its opposite ends in the upper split ends of the links 451. Because of this arrangement, as the axle 511 rises or falls, it is caused to move longitudinally about the pivot 64 as a center and to thereby prevent any turning of the spindle 481 about its vertical pivot 55 as the pivot 57 of said spindle swings about the drag link pivot 60 as a center. In actual practice the amount of this longitudinal movement of the front axle is so small, that both the radius rod 62 and clearance 65 may be entirely eliminated without any serious detrimental effect on the steering of the vehicle.

There is one very important factor involved, in any front axle set up, namely the permanence of the caster or the angle in a vertical longitudinal plane of the spindle pivots 55. It is to be noted that, in the present invention, the caster of the steering wheels remains absolutely fixed, irrespective of whether or not a radius rod 62 is used and irrespective of whether the torsion rod 33 becomes either deformed or even completely broken.

This feature of fixed caster angle is also of some importance with respect to the back axle, where it ensures the permanency of the arcs through which the universal joints of the propellar shaft are caused to swing as the axle rises and falls. In the case of both front and rear axles, the construction whereby the caster angle is permanently maintained, irrespective of what may happen to the resilient portions of the spring suspension, also ensures that all torque imposed upon the axles by the brakes is suitably taken care of without the need of any special torque rods for this purpose. (In the case of Figs. 16 and 17, the caster angle is permanently fixed but is not constant for all axle positions and, in this case, a torque rod is required).

In the case of both the front and the rear axle spring suspensions, the links 45, 451 incline downwardly and outwardly. This arrangement has two distinct advantages. One effect of this angular linkage arrangement is that it causes each end of the body of the vehicle to always tend to centralize itself relatively to the companion axle 51 or 511 as the case may be. This centralizing tendency is caused by the effect of gravity, which may be considered a resilient, downwardly-acting force acting between the body and the roadbed and operating in a manner identical in its effects to a metal spring connecting said body and the roadbed. It is to be distinctly understood that this force tending to centralize each end of the body is of a resilient nature. Because of this fact the body of the vehicle is not subjected to directly connected lateral forces as a consequence of a lateral axle movement. Such a lateral axle movement occurs, for instance, when one end only of the axle is raised or depressed and thereby causes horizontal, lateral-movement components in all parts of the axle except at its momentary axis of rotation in those particular cases where said axis lies within the overall length of said axle. In the conventional spring suspension, all movements of the axle which are lateral with respect to the vehicle as a whole are transmitted directly to the body. Because of the relatively large inertia of the latter, no appreciable lateral body movement actually occurs when such a conventional vehicle is travelling at high speeds and one end of the axle moves up or down. What does occur is that said body is subjected to a sharp lateral rap of considerable force every time the axle moves in any manner other than translationally. This not only seriously impairs the riding qualities of the vehicle but also subjects the body to a succession of forces which in a short period of time loosen all the body bolts and other such fastenings and cause the whole body to rattle.

Another important advantage obtained by the angular arrangement of the links 45, 451 is that it absolutely eliminates wheel tramp. This latter may be broadly defined as a periodic vibration of either axle in a vertical transverse plane, the definition being usually limited to a rotary movement about an axis of rotation located at some point in the axle. In general it may be said that, if one wheel is lifted, and if this movement causes a downward thrust on the opposite wheel, then wheel tramp results. Such wheel tramp is prevented in the present invention by ensuring that the downward thrust of the axle pivot 46 or 461, as the case may be, lies approximately in a plane $a_2$ intersecting the contact of the tire with the road (lines $b$ and $c$) as indicated in Fig. 25. When such a condition obtains, a vertical upward thrust against one wheel is opposed by a directly opposite force passing through the axle pivot 46 or 461 and hence no downward thrust is imposed upon the opposite wheel as occurs in the conventional spring suspension.

Another very important advantage of the present invention is that all forces tending to twist the frame have been very markedly reduced as compared with conventional spring suspensions. Frame twist may be defined as a torque force applied to one end of the frame different in direction and intensity from the torque force imposed upon the other end of the frame. In the present invention, when, for instance, one of the vehicle wheels is thrust upwardly, the frame hangers 32, 320 (or 321, 3210) are subjected to a force intersecting the axis of the pivot pin 43 (and adjacent short end of the companion torsion rod 33). Such a force constitutes a torque force imposed upon the adjacent end of the vehicle frame, and this, all by itself, would of course, cause frame twist. It is to be noted, however, that, at this time, the companion torsion rod 33 is under increased stress by reason of the wheel thrust in question and hence the torque arm 35 is subjected to an increased force which also constitutes a torque force upon the vehicle frame. It is to be noted that this increased force which is imposed upon said torque arm 35 is located at one end of the vehicle while the torque force at the pivot pin 43 is at the other end of the vehicle. Furthermore, the forces are not greatly different in intensity or direction. The result of this condition of affairs is that both ends of the vehicle are subjected to torque forces which do not differ from each other to any marked degree in either direction or intensity, and hence frame twist is very considerably reduced. In other words, when a certain wheel of the vehicle is forced upward, instead of twisting the one end of the vehicle frame as in the conventional spring suspension the present invention provides that the entire one side of the vehicle will be lifted a minute distance, thereby increasing the inertia resistance of the sprung weight to the resilient forces caused by the wheel movement, and very markedly decreasing frame twist and its concomitant twisting and rocking of the body and resulting loosening of the various body fittings.

As to this matter of frame twist, it is to be noted that satisfactory results can only be obtained if the "dead" end of the torsion rod extends toward the opposite end of the vehicle and is positioned beyond the center of gravity of the car. If this condition does not obtain, then both ends of the torsion rod cause torque forces which act in the same general direction and upon the same end of the vehicle and hence cause frame twist. If, as in the present invention, the "dead" end of the torsion rod is situated beyond the center of gravity of the sprung weight (body) then the forces are acting upon opposite ends of the vehicle and frame twist is reduced.

It is also to be noted in the present invention that the means whereby resilience is effected does not involve any frictional resistance such as occurs in the case of a conventional leaf spring, and hence is free and non-energy absorbing in its action. Also, having no frictional resistance (except bearings which afford no particularly difficult lubrication problems) it does not vary because of change of frictional resistance as in the case of the conventional leaf spring.

In Figs. 1, 2, 4 and 6 is shown an inexpensive form of "fly wheel" shock absorber 66 which depends entirely upon inertia or momentum for the dampening of periodic vibrations. The principal of this shock absorber is fundamentally the same as that of all shock absorbers—namely, to permit a resilient member to be subjected to strain, but to prevent this strain from exerting its full force in the opposite direction when the force which originally caused the strain is either released or otherwise changed in amount. Such a strain may be either absorbed (dissipated into heat) as in the ordinary shock absorber, or, as in the present case, it may be damped out by being momentarily opposed by a counter-acting force. The shock absorber 66 uses inertia or momentum as the counter-acting force, and consists of a disk or wheel mounted on each torsion rod 33 and secured thereto by a set screw 67 or otherwise. One of the outstanding novel features of this shock absorber 66 is that it is located intermediate of the length of its companion torsion rod 33. By reason of this fact it is practically inoperative when the vehicle is going over small irregularities at high speeds, i. e., it does not retard the action at all for the "boulevard ride" of the vehicle. This is because a considerable portion of the companion torsion rod 33 is disposed intermediate of said shock absorber 66 and the companion crank arms 41, 410. Thus, said crank arms 41, 410 together with their companion spindle 48 (or 481) and other unsprung weight may move freely within small limits without any immediate or important effect on the shock absorber 66. Under such circumstances, the shock absorber is substantially inoperative, particularly inasmuch as the time interval of such small movements is very short. When, however, the companion spindle 48 (or 481) is subjected to a more vigorous upward or downward thrust, the corresponding angular twist of the torsion rod 33 is greater. Also the time used in making this movement is greater. These two factors cause the torsion wave to travel clear back to the shock absorber 66, causing the latter to be partially rotated. Then when the "live" end of the torsion rod is subjected to a sudden change of angular velocity in the one or other direction, the resulting torsional wave passes along the torsion rod until it again meets the shock absorber 66 which is at this time moving under the influence of inertia in either the opposite direction or at a disproportional rate of speed. This arrangement provides a shock absorber which will operate when it is required for relatively large wheel deflections, and yet be totally inoperative when not required for the "boulevard ride." In addition to this, such a use of inertia or momentum to "absorb" or negative the reactive effect of road shocks provides a shock absorber which will operate indefinitely without attention by reason of the fact that it contains no parts subjected to friction and no moving fluids.

Although this and other types of shock absorber have been shown in the drawings, and although it has been found definitely desirable to employ shock absorbers, nevertheless the riding qualities of a vehicle equipped with the present invention are not seriously reduced even if the shock absorbers become inoperative or are left off althogether. This is in sharp contrast to the ordinary individually sprung wheel suspension using helical springs, in which case the vehicle receives a terrific wracking and pounding if the shock absorbers become even partially inoperative. In the present invention, it has been found by definite test, that the periodic vibrations of the spring suspension are very rapidly damped out, even in the total absence of shock absorbers. As an example of how marked the dampening action is, a series of tests were run on three types of spring suspension in which the load and displacement were the same and also the maximum metal stress in the respective resilient members. It was found that a helical spring, under these circumstances, would come to rest after 800 vibrations—the leaf spring after 20 vibrations—and the present invention after 5 vibrations. Why the leaf spring should be so superior to the helical spring is easy to understand because of the relatively high friction in a leaf spring even when well lubricated. The significant fact is that in applicant's spring suspension, there is no such leaf spring friction and yet its performance is four times as good as the helical spring set up, despite the fact that the frictional resistance of the present invention is not materially different from that of the helical spring, individually sprung wheel set up.

In the present invention, side way of the vehicle frame can be reduced to any desired extent including zero side sway and even negative side sway. To deal rationally with this question it is highly desirable that we first mathematically split the center of gravity of the car into two components, each component lying in the intersection of a vertical, longitudinal, medial plane with vertical, transverse planes passing through the axes of the companion pair of wheels. Each component of the center of gravity is then the mass which, when the vehicle is steered to the right or left, creates a lateral force which tends to tip its companion end of the vehicle in a lateral direction relatively to the companion. The reason why it is desirable to deal with a center-of-gravity component over each axle individually is because the component over the front axle is usually at a different height above the ground from the center-of-gravity component over the rear axle and hence requires a different arrangement to obtain the same kind and degree of side sway. This side sway should be the same at both ends of the vehicle because otherwise the frame is subjected to twisting forces whenever any side sway occurs.

On this basis, we will now consider the side sway at the front of the vehicle with the spring suspension in normal position as in Fig. 3. If the front center-of-gravity component lies on the line $d$, there results a zero side sway of the frame relatively to the axle when the vehicle is turned to the right or left as, for instance, when rounding a corner. This is because said line $d$ intersects the axis of the axle pivot 46I.

This is believed by the inventor to be a correct statement, but it is admitted that no specific tests have been made to ascertain exactly where the center of gravity must be to obtain zero side sway. However, assuming this relationship, as stated, to be correct, then it follows that if the center-of-gravity component is above the line $d$ the resulting side sway will be positive as in the conventional spring suspension.

If, on the other hand, the center-of-gravity component is situated below the line $d$, as for instance, on line $e$, then the side sway is negative. Obviously the amount of such negative side sway is proportional to the distance between the lines $d$ and $e$. One important feature of negative side sway is that, when rounding a corner, the center of gravity is shifted toward the inside of the curve and hence lessens the possibility of the car turning over. Another distinct advantage of negative side sway is that the tendency of the person or goods in the vehicle to move sidewise under the influence of centrifugal force is lessened. This is because the supporting surface is tilted when the side sway occurs and hence one component of the side sway force is directed perpendicularly downward against said supporting surface. Negative side sway has the further advantage of being much superior as to its psychological reaction on the persons riding in the vehicle as compared with zero or positive side sway, not only because of the decrease in the force tending to move the persons sidewise in their seats, but also because there is a natural tendency for a person to lean inward (or bank) on a curve. This psychlogical effect is probably chiefly due to the instinctive feeling of greater safety which is obtained when the center of gravity is shifted toward the inside of the curve along which the person is moving.

It is obvious that the amount of side way varies with the position of the axle relatively to the vehicle frame. When it is desired to keep the maximum possible side sway under any certain definite amount, this may be effected by either positioning the axle pivot high enough above the axle to accomplish this result, or by suitably lowering the center of gravity of the body. It is to be noted in this connection, however, that the factors affecting side sway change very considerably when the frame and axle are approximately in the extreme position of Fig. 8. This is due to the fact that, when the parts are approximately in this position, any outward centrifugal movement of the inner part of the vehicle frame, tends to cause the pivots 43, 44 and 46 to all lie in one straight line, and such a "dead center" tendency is resisted by forces which rapidly approach infinity as said pivots approach a straight line relationship. It should be borne in mind, however, that any such condition as that shown in Fig. 8 would be exceeding rare in actual practice, particularly when the vehicle is equipped with shock absorbers whose chief function is to restrain upward movements of the body relatively to the axle.

It has also been found in the present invention from actual practice and from analysis based on said practice that side sway has been rendered mathematically more negative in amount by reason of the angularity of the links 45 which normally slope down and out from the axle pivots 46I. Because of this angularity, when the body shifts laterally in rounding a curve, the outer part of the body is elevated and the inner part allowed to fall, relatively to the axles. Such a tilting is equivalent in its effect to lowering the center of gravity of the body or elevating the axle pivots 46I, in that any one of these three changes renders side sway more negative.

*Friction shock absorbers—Figs. 10 and 11*

These figures illustrate a modified form of shock absorber in which frictional resistance is employed to restrain the rotation of each torsion rod 332 in a reverse direction (counter-clockwise, as viewed in Fig. 11). In this case, each of said torsion rods 332 is provided with an arm 70 which is located intermediately of the length of said rod in a manner analogous to the location of the shock absorber of Figs. 1, 2, 4 and 6. Fastened to said arm 70 is a friction cable 71 which passes around a fixed, friction head 72, the latter being rigidly secured to the vehicle frame 302 by a bracket 73. The opposite end of said friction cable 71 is secured to the inner end of a helical tension spring 74 which is connected at its outer end to the vehicle frame. Thus, when the companion vehicle wheel 50, for instance the left rear wheel, is moved upwardly, its companion torsion rod 332 is rotated in a clockwise direction, as viewed in Fig. 11. To this particular movement the frictional cable 71 offers no resistance, merely giving out slack which is automatically taken up by the tension spring 74. When, however, said torsion rod moves counter-clockwise, as viewed in Fig. 11, the now taut cable is dragged around the periphery of the friction head 72 against the frictional resistance set up between said cable and said friction head by reason of the tension spring 74.

Compound torsion rod—Fig. 12

In certain vehicle spring suspension installations, the chassis of the vehicle is too short to permit of a torsion rod which is of the type shown in Figs. 1–9 and is, at the same time, able to provide a sufficient torque resistance together with a sufficient angular movement and a maximum metal stress of sufficiently small amount. In such case the modified form of torsion rod shown in Fig. 12 may be employed. This consists of a primary torsion rod 333 which is secured at its outer end (in this case the front end) to a concentric sleeve 75 which latter is, in turn, secured to the outer end of a concentric torsion tube 76 the latter extending some distance inwardly from said sleeve 75 and journalled at its opposite ends at 77 and 78 on the frame of the vehicle. Preferably the inner end of said tube has a bushing 80 secured within its bore in which the adjacent portion of the torsion rod 333 is supported and thereby restrained against vibration. The inner end of said tube 76 is suitably limited in rotary movement by a torque arm 353 which is suitably secured thereto and is adapted to function in a manner similar to that of the torque arm 35 of Fig. 4.

Knee action adaptation—Figs. 13–15

As shown in these three figures, the invention is also adapted to be used in conjunction with a "knee-action" or individually articulated wheel suspension. In this case the torsion rod 334 is mounted substantially as before and is provided with a similar crank arm 414 and link 454. In this construction, however, each wheel spindle 484 is articulately connected to the frame 304 and is not connected through an axle 51 with a companion wheel spindle 48, as in Figs. 1–9. Connection between said wheel spindle 484 and the frame 304 of the vehicle is effected by an upper and a lower guiding link 81 and 82, the upper link 81 being shorter than the lower link 82 to enable the wheel to "track" accurately as it rises and falls. In other words the linkage arrangement and proportions of this knee action spring suspension are such that the contact point between the tire 504 and the ground always lies in the vertical line 83 which is located at a fixed distance from the vertical, longitudinal, medial plane 84 of the vehicle frame 304.

Torque arm construction—Figs. 16 and 17

This construction shows a modified means of compensating for brake torque and horizontal axle thrust. In this case the crank arm 415 and link 455 are used only to carry the vertical load. All brake torque and other similar forces are carried by a two armed torque rod (or "wishbone") 85, 850 which is connected at its rear end by a universal joint 86 with the crank case 87 of the motor 90 (or otherwise connected with the vehicle frame 305) and has the front ends of its two arms 85, 850 secured to the axle 515 at 91.

By reason of the connection of said axle with the frame by said torque rod 85, it is not feasible to rigidly connect the pivot pin 465 with the wheel spindle 485. Hence a swinging bracket 475 has been provided, its upper end carrying said pivot pin 465 while its lower end is suitably pivoted on a rocking pin 92 suitably journaled in a bearing box 93 which is secured to the spindle 485, the axis of rotation of said swinging bracket 475 relatively to said spindle 485 being substantially horizontal and transverse of the vehicle.

It is obvious that such a swinging bracket 475 can be made much lighter in weight for a given height than can the trunnion 47 of Figs. 1–9, and hence such a swinging bracket construction is particularly adapted to be used when, to obtain a large amount of negative side sway, it is desired to have the pivot pin 465 disposed at a considerable elevation relatively to the main frame 305 of the vehicle. This vertical position of said pivot pin 465, as has been previously described, has a direct relationship on the amount of sidesway to which the main frame 305 of the vehicle is subjected relatively to the axle 515 when the vehicle is rounding a curve, the higher this pivot pin 465 being, the less the resultant side sway. It is admitted, on the other hand, that the construction of Figs. 16 and 17 does not provide a fixed caster angle for the wheel spindles 485. However, a passenger automobile constructed in this manner has been given exceedingly rigorous tests and has shown very remarkable riding qualities.

Actual tests have also shown that a shock absorber, arranged as in these Figs. 16 and 17, gives very good results as to riding quality. In this case the shock absorber 94 is directly connected between the frame 305 and the central part of its companion axle, in this case the front axle 515. The shock absorber illustrated is of the plain, direct-acting, hydraulic plunger type and is connected at its upper and lower ends respectively by resilient ball and socket joints 95 and 96 with the frame and axle. In the present invention a shock absorber has, as one of its chief functions, the preventing of pitching. The placing of the shock absorber 94 at the center of the axle provides for a maximum absorption of pitching tendencies without materially affecting the action of one end of the axle relatively to the other. This is because when both ends of the axle either rise or fall (as occurs in pitching) the shock absorber operates to its maximum capacity because its movement is then the same as that of each of the wheel spindles 485. When, however, one end only of the axle rises or falls relatively to the other end of the axle, then the resistance to such a movement by said shock absorber is approximately only half of what it would have been if both ends of the axle had been moved a similar amount.

Heretofore it has been common practice to place a shock absorber at each end of each axle so as to reduce side sway in addition to reducing the pitching action. In the present invention side sway has not only been completely eliminated but a step further made and negative side sway introduced. This releases the shock absorbers from the necessity of cutting down on the normal positive side sway and enables them to function at maximum efficiency in the absorption of pitching by being placed at the center of the axles. This has the further advantage of reducing frame twist by reason of the fact that all shock absorber pressures are imposed directly upon the medial line of the vehicle, thereby merely tending to lift or raise the same bodily (against the full force of its inertia) as compared to the twisting action which occurs when the shock absorber forces are imposed upon only the one corner of the vehicle.

The conventional shock absorber at each end of the axle also has the function of restraining periodic vertical vibration, but such restraining power is of very incidental importance in the present invention because such vertical vibrations are quickly damped out by its inherent construction and action, as has been previously described. This damping action is so pronounced that the vehicle has fairly good riding qualities even when the shock absorbers become totally inoperative. This is in sharp contrast when any one of the shock absorbers of an ordinary "knee-action" spring suspension fails to function.

Three axle vehicle—Fig. 18

This adaptation of the invention relates to the type of three axle vehicle disclosed in detail in my Patent No. 1,934,670 and patent application Ser. No. 696,803, filed Nov. 6, 1933. Such a vehicle is provided with a horizontal transverse crank shaft 97 constructed in two sections which are joined by a clamp collar 98. Said crank shaft is journalled at opposite ends in the bearing heads 100 which latter are mounted in the frame 306 (see also Fig. 7 of my patent application Ser. No. 696,803, filed Nov. 6, 1933). The crank arms 101 of said crank shaft 97 extend out beyond said frame and have their crank pivots journalled at 102 in companion equalizing members 103. Means connect opposite ends of each of said equalizing members 103 with a companion end of the drive axle 104 and the trailing or "third" axle 105.

Connected integrally or otherwise to aforesaid clamp collar 98, and thereby to the crank shaft 97, is a secondary bevel gear 106 meshing with a primary bevel gear 107, the latter being secured to the rear section of a torsion rod 336. Said torsion rod is journalled at its rear end in one of the bearing heads 100 on a bearing bracket 108, while its front end is connected through a universal joint 110 with the rear end of the front section of the torsion rod 336. The rear end of said front torsion rod section is journalled on the frame at 111 while its front end is mounted in the same manner as that shown in either Fig. 4, 12 or 20.

By this construction the crank shaft 97 is resiliently restrained against rotation. The advantages of accomplishing this result in this manner as compared with the helical springs of Figs. 3 and 1 of my patent application Ser. No. 696,803, are: (A) that the roller chain is eliminated, (B) that shock absorbers can be applied to the action of said crank shaft 97 in the manner of Figs. 4, 12 and 19 of the present application, and (C) that the arrangement permits of being used in cases where the available space is too scant or badly disposed to permit of conveniently using the helical spring arrangement.

Reactance shock absorber—Fig. 19

Fig. 19 illustrates a form of shock absorber somewhat analogous to the shock absorbers of Figs. 4, 10 and 11. In this case, however, the shock absorber action is transferred from the central portion of the torsion rod 337 directly to the "dead" (left) end thereof. Secured to said "dead" end is the usual torque arm 357 having an adjustment screw 367 analogous in general arrangement to the similar members 35 and 36 of Fig. 4. Also secured to said "dead" end of said torsion rod 337 is a twist tube 112 extending inwardly (rearwardly) or toward the right therefrom and suitably journalled on the frame 307 at 113 and 114. The extreme inner end of said twist tube 112 is provided with an annular collar 115 which is secured by bolts 116 or otherwise to a hydraulic or other shock absorber casing 117. The torsion rod 337 passes through said casing 117, any leakage of fluid around said rod being prevented by conventional packing glands 118 and 119. The latter are, of course, omitted when the shock absorber is not of the fluid type.

In this construction it is to be assumed that the twist tube 112 is stiff and rigid and hence that the shock absorber 117 is in effect interposed between an intermediate portion of the torsion rod 337 and its dead end at 357. The effect of this arrangement is as follows: When the companion axle moves up or down small distances at high speed, as on a "boulevard" ride, the "live" portion or end of the torsion rod twists back and forth sufficiently to take care of such movements before the torsional wave is able to travel to the shock absorber and enable the resistance of the latter to partially negative the original axle movement which caused the wave. Under such conditions, therefore, the shock absorber is inoperative as far as its axle dampening effect is concerned, even though torsion waves do reach it and cause it to move to some extent. This action is precisely the same as that previously discussed with reference to Figs. 1-11.

The action is also similar when the axle moves up a long distance at relatively low speeds because in such case any resistance of the shock absorber to such movements is transmitted directly to the frame through the twist tube 112. Under these circumstances then, the action is exactly the same as though said shock absorber were directly connected to the frame, as in Figs. 10 and 11. However, in the construction now under consideration (Fig. 19), the action is unique during the initial, return, downward movement of the axle. Under these circumstances, instead of directly opposing the movement, the shock absorber transfers the force to the torque arm 357 which thereupon tends to lift said arm away from the frame 307, and actually does so if the incident force is sufficiently sharp and sudden. It is to be borne in mind that normally there is a heavy pressure urging said torque arm 357 against said frame 307, so that such a lifting away movement can only occur when the reaction force is very violent. And when it is violent, the force is prevented from directly affecting the frame, but is absorbed, instead, in additional torsion on the torsion rod 337.

In this connection it should be added that the setting of any shock absorber used with the present invention is preferably such that its resistance is chiefly imposed upon the torsion rod when its companion axle is moving downward toward its normal position from an above-normal position. Such a shock absorber is ordinarily denominated a one-way shock absorber, but, when set for the present invention in the manner just mentioned, is properly to be denominated a half one-way shock absorber, inasmuch as the resistance is imposed while the axle is moving down toward its normal position, but is not imposed as the axle continues to move downward past said normal position. This is because when the axle is moving downwardly beyond its normal position, instead of first merely releasing the upward pressure in direct proportion to displacement, and thereafter actually jerking the body down as in the conventional spring suspension, the present invention, under these same circumstances, first rapidly decelerates the amount of upward pressure and then avoids jerking the body down by completely disconnecting all resilient pressure between the axle and the body by allowing the torque arm (35 or 357) to swing away from the frame.

*Compound torsion rod—Figs. 20–22*

It is desirable that when a vehicle is at rest and is carrying whatever load it is intended to carry, the parts be approximately in the "normal" position of Fig. 7. This is because: (A) in this position the smallest initial pressure increments cause the maximum upward axle movement; (B) the total upward axle movement is large enough to properly "cushion" the heaviest upward forces; and (C) the axle can move a considerable amount downward before it reaches the extreme position of Fig. 8. With the constructions thus far described, this result cannot be attained if the live load varies considerably in amount as, for instance, in the case of the rear axle of a truck.

Under such circumstances the construction of Figs. 20–22 may be adopted. In this case the primary torsion member or torsion rod 338 functions precisely as in the other construction described, being connected at one end with a crank arm 418 and provided at its other end with a torque arm 358, thus imposing a certain definite resilient torque force upon said torque arm 358. This torque force is sufficient to provide suitable riding qualities to the back axle when the truck is entirely unloaded or less than half loaded.

When the truck is completely loaded or more than half loaded, an auxiliary torque force is adapted to be imposed upon the crank arm 418. This is effected by a torsion tube 120 which is suitably journalled on the frame at opposite ends at 121 and 122. The bore of said torsion tube is provided with the bushings 123 and 124 in which the aforesaid torsion rod 338 is journalled. The "live" (right) end of the torsion rod 338 is provided with an annular collar 125 having a pressure lug 126 projecting inwardly from one side of its bore. Secured by welding or otherwise to the adjacent end of the torsion tube 120 is a head 127 having a pressure tongue 128 projecting laterally therefrom and adapted to engage with aforesaid pressure lug 126. Secured by welding or otherwise to the "dead" (left) end of said torsion tube 120 is a large sprocket wheel 130 engaged upon its periphery by a belt chain 131. The latter at its inner portion engages with the periphery of a small sprocket wheel 132 secured to one end of a shaft 133. Said shaft is suitably journalled on a bracket 134 secured by a cap screw 135 or otherwise to the frame 308.

Also secured to said shaft 133 is a ratchet wheel 136, the peripheral ratched teeth of which are adapted to be engaged by a ratchet dog 137 pivoted to the bracket 134 upon a pivot pin 138. A past-dead-center tension spring 140 is connected at 141 to said bracket 134 and at 142 to the ratchet dog 137 and it is adapted to either resiliently hold said ratchet dog in or out of engagement with the teeth of the ratchet wheel 136 by reason of the geometric position of the past-dead-center spring connections 141 and 142 relatively to the ratchet dog pivot 138. Said ratchet dog 137 is adapted to be manually thrown either into or out of engagement with said ratchet wheel 136 by a throw lever 143 which is secured to the outboard end of the pivot pin 138.

Secured to the outboard end of the shaft 133 is a crank lever 144 which permits of the convenient manual rotation of said shaft and, through the belt chain 131, of the "dead" end of torsion tube 120. The amount of torsion which can be imposed upon said torsion tube is definitely limited by a stop pin 145 which is secured to the large sprocket wheel 130 and is adapted to come into engagement with the lower face of a stop arm 146 secured by the cap screw 135 to the frame 308. In a similar manner, the extent to which said torsion tube 120 can be manually rotated in a negative direction by the crank lever 144 is limited by a limiting pin 147 also secured to said large sprocket wheel 130 and adapted to come into contact with the upper face of said stop arm 146.

When the truck has been loaded to more than half of its total live load capacity, the operator is enabled, if he wishes to improve the riding quality of the rear end of said truck, impose a torsional strain upon the torsion tube 120 by first throwing the ratchet dog 137 to the operating position shown in Fig. 21, and then rotating the crank lever 144 in a counter-clockwise direction (as seen in said Fig. 21). If the operator wishes to impose a maximum torsional stress upon the torsion tube 120, he continues this rotation until the stop pin 145 comes into contact with the stop arm 146, as shown in Fig. 21. Under such conditions the crank arm 418 is subjected to the torsional stress of both said torsion tube 120 and also the torsion rod 338. When a sufficient negative movement of said crank arm 418 occurs (dropping of the axle to or near the position of Fig. 8) any possibility of imposing a negative stress in the torsion rod 338, and thereby jerking down the vehicle frame is prevented by the torque arm 358 moving away from the frame 308. Similarly, when a sufficient downward axle movement occurs, the pressure lug 126 connected with the crank arm 418 moves out of contact with the pressure tongue 128 of the torsion tube 120, thereby preventing said torsion tube from ever jerking down the vehicle body.

*Wheel tramp, etc.—Figs. 23–26*

These figures are diagrammatic in nature and illustrate how the present invention may be varied to obtain a minimum of wheel tramp (pressure line $a$, $a_1$, $a_2$ and $a_3$) and, at the same time, easy steering (spindle pin angle) and different types and amounts of spring cushion (length and normal angularity of the crank arms). In Fig. 23 is shown a construction in which the link 45a is positioned directly over the center of the tire tread. Such an arrangement absolutely prevents wheel tramp as has been previously explained. In addition to this, the normal position of crank arm 41a is perpendicular to its link 45a and hence small increments of pressure at this normal position of the spring suspension permit of relatively large vertical movements of the axle, providing a good "boulevard ride." Also the total amount of vertical upward movement of the axle is relatively large, providing what is commonly denominated a good "cushion." Fig. 24 shows an arrangement which has the advantage, as compared with Fig. 23, of a less protruding wheel hub but the disadvantage of a somewhat smaller cushion. This construction too provides a very good "boulevard ride." Fig. 25 provides a better "cushion" than Fig. 24 but a somewhat worse "boulevard ride." Fig. 26 has as its chief characteristic a good "cushion" but does not provide even as good a "boulevard ride" as Fig. 25. In all cases, however, wheel tramp is entirely eliminated and the steering spindle so arranged as to permit of very easy steering. It is to be assumed, of course, that any of these arrangements can be provided with any suitable caster and camber co-relationship.

Leaf spring with negative side sway—Figs. 27 and 28

In this construction is shown how negative side sway may be obtained with a vehicle spring suspension which is conventional except as to the height of the semi-elliptic spring pivots 150 and 151. The center of gravity of the sprung weight (body) of the vehicle is shown as being located at 152. The rear axle component thereof is shown as located at 153. The significant feature is that this center-of-gravity component is located below the pivots 150 and 151 and hence causes the vehicle body to sway in a negative direction when said vehicle is travelling and is turned to the right or left. It is obvious that zero side sway would be obtained if said pivots 150 and 151 were located on the same horizontal line as the center-of-gravity component 153. It is to be understood that the actual amount of side sway also depends upon the vertical position of the axle relatively to the frame, and that this relative position changes somewhat when the vehicle is travelling. But this fact only modifies the general factors involved in side sway and hence are thought not to warrant detailed analysis.

In such a construction as that of Fig. 27, any vertical movement of one end only of the axle 5110 causes a very considerable lateral movement of the semi-elliptic spring 154 relatively to the vehicle frame 3010. This has been taken care of in the present invention by providing spring pivots 150 and 151 of considerable length (see Fig. 28). A compression spring 155 is interposed between each end of each spring 154 and the frame 3010 so as to resiliently center the springs, axle, etc. relatively to the body. A small clearance has also been provided between the outer faces of the spring and the inner face of each pivot head 156. This prevents lateral movements of the axle (as when one end only is raised) from directly causing lateral thrusts against the body.

Torsion rod on axle—Figs. 29 and 30

This construction also provides negative side sway but employs a torsion rod 3311 to furnish the resilience of the spring suspension in a manner similar to that of Figs. 1–26, but different in that, in the present case, the "live" end of said torsion rod 3311 is journalled on the axle instead of on the frame. In this case, each end of the axle is provided with a post 156 in the upper end of which is journalled the "live" end of the torsion rod 3311, the latter being connected through universal joints 157 and 158 with the "dead" end of said torsion rod. This "dead" end is suitably journalled on the vehicle frame at 160 and is arranged at its extreme portion with a suitable torsion anchorage similar to that shown in Figs. 4, 12, 19 or 20. Each torsion rod 3311 is provided with the usual crank arms 4111 and links 4511, the latter being pivoted at their normally lower inner ends at 161 on the frame 3011.

In this case the center of gravity is at 15211 and the component thereof over the axle as 15311. As the latter is situated below the axle pivot 4611 ("live" end of torsion rod 3311) the result is that in this normal position of the vehicle, the side sway is negative.

Railway truck—Figs. 31–33

These figures illustrate a typical adaptation of the present invention to the truck and truck mounting of a railway vehicle. In such a vehicle, because of the tremendous pressures involved, the link and crank arm construction of the previously described spring suspensions is impractical and has been replaced by an eccentric-roller construction. The torsion rod 3312, as in all the other constructions illustrated, is suitably journalled on the main frame 3012 of the vehicle, in this case at its outer end, in a pair of hangers 3212. Between these hangers and rigidly secured to the torsion rod 3312 is an eccentric 4112 provided on its outer cylindrical face with an anti-friction roller 162, which may, if desired, be provided with flanges 163 as shown. This roller bears downwardly upon the horizontal top surface of the companion end of a primary bolster 164, the latter being free to rise or fall in its hanger guides 165, and limited as to its transverse movement by a radius rod 166 pivoted at 167 to the main frame 3012 and pivoted at 167 to said primary bolster 164.

When the upward pressure of said primary bolster 164 relatively to the main frame 3012 of the car increases beyond normal (the drawings show all parts in normal position), the eccentric 4112 partially rotates about the axis of its companion torsion rod 3312, thereby causing the torsional strength of said torsion rod to resiliently resist upward movement of the primary bolster 164. The force of this resistance is of the geometric, accelerated rate of increase type similar to that of the constructions of Figs. 1–26. Likewise, the downward movement of said primary bolster is also similar to said constructions of Figs. 1–26 in that the downward pressure is geometric with an accelerated decrease of rate. However, said primary bolster 164 and eccentric 4112 are not pivotally connected together and hence, as said bolster moves downwardly, it is not arrested by any such almost-dead-center linkage arrangement as in Fig. 8. In this case the extreme downward movement of said bolster is limited in a positive manner by the provision of a stop web 168 formed integrally at the lower end of the hanger guides 165. Such an action, however, can only very rarely occur in actual practice, because the roadbed upon which railway rolling stock travels is very much more level than the roadbed over which an automobile has to travel.

The primary bolster 164 is pivotally connected at its lower central part on a vertical axis to the upper central part of a secondary bolster 170 and the latter vertically, slidably arranged at its opposite ends in truck frames 171, 171 in the usual and well known manner. Each truck frame extends in opposite longitudinal directions from said secondary bolster 170 and has the usual axles 172 journalled therein, said axles being provided with the usual flanged wheels 173 which are shrunk thereon.

The resilient connection between each of the ends of the secondary bolster 170 and their companion truck frames 171 is similar to the previously described resilient connection between each end of the primary bolster 164 and the main frame 3012 of the car. An eccentric 4113 is suitably journalled horizontally at its opposite ends in each truck frame 171 and is provided on its cylindrical, eccentric periphery with an anti-friction roller 174. The latter bears upwardly against the horizontal, lower face of the companion end of the secondary bolster 170. In the particular arrangement shown, any use of a long torsion rod (such as the torsion rod 3312) for resiliently opposing rotation of the eccentric 4113 is obviously impracticable because of space limitations, and hence, in this case, the resilient opposition to rotation is furnished by a helical tension spring 3313 which is secured at one end at 175 to the adjacent truck frame 171 and is pivoted at its other end at 176 to a rocker arm 177 suitably secured by a key 178 or otherwise to said eccentric 4113.

It will be seen from the foregoing that the present invention, as to Figs. 31–33, provides an improved form of resilient connection between each end of the primary bolster 164 and the main frame 3012 and, in addition, the same type of resilient connection between each end of the secondary bolster 170 and the companion truck frame 171. It is obvious that either pair of these resilient connections may be entirely omitted without impairing the operation or effectiveness of the other pair. It is also obvious that, in the particular conventional construction shown, the center of gravity of the sprung weight is considerably above all of the spring pivots. This means that the car would not have negative side sway when rounding a curve, but it is to be kept in mind that railway curves are almost invariably banked, and negative (or small positive) side sway is obtained in this manner.

I claim as my invention:

1. A vehicle spring suspension comprising: a frame; a spindle having a wheel journaled thereon; an axle pivot located approximately in a horizontal plane intersecting the component of the sprung-weight center of gravity which is situated in the same vertical transverse plane as said spindle; means connecting said axle pivot with said spindle; and resilient means connecting said axle pivot with said frame.

2. A vehicle spring suspension comprising: a frame; a spindle having a wheel journaled thereon; an axle pivot located in or above a horizontal plane intersecting the component of the sprung-weight center of gravity which is situated in the same vertical transverse plane as said spindle; means connecting said axle pivot with said axle; and resilient means connecting said axle pivot with said frame.

3. A vehicle spring suspension comprising: a frame; a spindle having a wheel journaled thereon; a journal; means connecting said journal with said frame; a crank arm pivoted in said journal; means for resiliently restraining rotation of said crank arm relatively to said frame; and a link pivotally connected at its opposite ends to said crank arm and to said axle, the axis of the latter pivotal connection lying substantially in a horizontal plane intersecting the component of the center of gravity which is situated in the same vertical transverse plane as said spindle.

4. A vehicle spring suspension comprising: a frame; a rod constructed of two sections disposed at an angle to each other, the one section being provided with a crank arm; means for resiliently restraining rotation of the other section; a universal joint interposed between and connecting said rod sections; a spindle; a wheel journaled on said spindle; and means connecting said spindle and said crank arm.

5. A vehicle spring suspension comprising: a frame; a torsion rod rotatably mounted on said frame and provided at one end with a crank arm; a concentric torsion tube substantially shorter in length than the length of said torsion rod and secured at its outer end to the other end of said torsion rod; means connecting the inner end of said torsion tube with said frame; a spindle having a wheel journaled thereon; and means connecting said spindle and said crank arm.

6. A vehicle spring suspension comprising: a frame; a spindle having a wheel journaled thereon; a crank arm having a crank hub and a crank pin; means connecting said crank pin with said spindle; a torsion rod connected at its one end to said crank hub; and a torque arm connected to the other end of said torsion rod and adapted to normally bear against an adjacent face of the frame, the disposition of said torque arm, and the diameter, length and material of said torsion rod being such that, when said spindle has moved downwardly a certain distance relatively to the frame, said torque arm is lifted free of its erstwhile contact with the frame.

7. A vehicle spring suspension comprising: a frame; a crank arm having a crank pin at its free end and having its hub pivotally mounted on said frame; a spindle having a wheel journaled thereon, the axes of said spindle, crank pin and the pivotal mounting of said hub on said frame being approximately in the same horizontal plane in the normal position of the spring suspension; means connecting said crank arm pin with said spindle; and means for resiliently restraining rotation of said crank arm.

8. A vehicle spring suspension comprising: a frame, an axle provided with spindles at its opposite ends; wheels journaled on said spindles; an axle pivot located approximately in a horizontal plane intersecting the component of the sprung-weight center of gravity which is situated in the same vertical transverse plane as said spindles; means connecting said axle pivot with said axle; resilient means connecting said axle pivot with said frame; and shock absorbing means connecting the central part of said axle with the frame.

9. A vehicle spring suspension comprising: a frame; a spindle having a wheel journaled thereon; a torsion rod connected at one end to said spindle; means connecting the other end of said torsion rod with the frame; and an inertia member arranged on said torsion rod intermediate of its length.

10. A vehicle spring suspension comprising: a frame; a spindle having a wheel journaled thereon; a torsion rod connected at one end to said spindle; means non-rotatably connecting the other end of said torsion rod with the frame; and a shock absorber connected with said frame and with an intermediate portion of said torsion rod.

11. A vehicle spring suspension comprising: a frame; a spindle having a wheel journaled thereon; a torsion rod connected at one end to said spindle; means connecting the other end of said torsion rod with the frame; and a shock absorber also connected with said other end of said torsion rod and connected with an intermediate portion of said torsion rod.

12. A vehicle spring suspension comprising: a frame; a spindle having a wheel journaled thereon; a pivot located approximately in a horizontal plane intersecting the component of the sprung-weight center of gravity which is situated in the same, vertical, transverse plane as said spindle; resilient means connecting said pivot with said spindle, said resilient means being resilient in a vertical plane only; and means connecting said pivot with said frame.

13. A vehicle spring suspension comprising: a frame; an axle having wheels journaled thereon; resilient means between said frame and said axle; a centering spring adapted to laterally and resiliently centralize said axle relatively to said frame; means connecting opposite ends of said resilient means with said frame; and means connecting an intermediate part of said resilient means with said axle.

14. A vehicle spring suspension comprising: a frame; a spindle having a wheel journaled thereon; an axle pivot located above a horizontal plane intersecting the component of the sprung-weight center of gravity which is situated in the same vertical transverse plane as said spindle; means connecting said axle pivot with said spindle; and resilient means connecting said axle pivot with said frame.

15. A vehicle spring suspension comprising: a frame; a spindle having a wheel journaled thereon; a pivot located above a horizontal plane intersecting the component of the sprung-weight center of gravity which is situated in the same vertical transverse plane as said spindle; resilient means connecting said pivot with said spindle; and means connecting said pivot with said frame.

16. A vehicle spring suspension comprising: a frame; a torsion rod provided at one end with a torque arm and at its other end with a crank arm, the outer end of said torque arm being restrained from rotating in the one direction relatively to the vehicle frame; and a resilient pad interposed between said torque arm and the adjacent portion of said frame.

17. A vehicle spring suspension comprising: a frame; a torsion rod provided at one end with a torque arm and at its other end with a crank arm; a resilient pad arranged on said frame adjacent said torque arm; an adjusting screw arranged in said torque arm and adapted to make contact with said pad; a spindle having a wheel journaled thereon; and means connecting said spindle and said crank arm.

18. A vehicle spring suspension comprising: a spindle having a wheel journaled thereon and having a spindle pivot; a link normally pivoted at its upper end on said spindle pivot and lying substantially in a plane which intersects the roadway longitudinally and passes through the point of contact between the roadway and the wheel; and means pivotally connecting the lower end of said link with said frame.

19. A vehicle spring suspension comprising: a spindle having a wheel journaled thereon and having a spindle pivot; a link normally pivoted at its upper end on said spindle pivot and lying substantially in a plane which passes through the point of contact between the roadway and the wheel; and means pivotally connecting the lower end of said link with said frame.

20. A vehicle spring suspension, comprising: a frame; an axle provided with spindles at its opposite ends; a wheel journaled on each of said spindles; an axle pivot provided at each end of said axle; a link pivotally connected at its upper end to each of said axle pivots and normally projecting downwardly and outwardly; and means pivotally connecting the lower end of each of said links with said frame, the centerlines between the upper and lower pivotal connections of said links at each end of said axle lying substantially in planes which intersect the roadway at points at least equal to the width of the track of said wheels.

ALBERT F. HICKMAN.